Feb. 16, 1943.    W. R. ROYER    2,311,621
TIRE CHAINS AND THEIR APPLICATION
Filed March 15, 1941    2 Sheets-Sheet 1
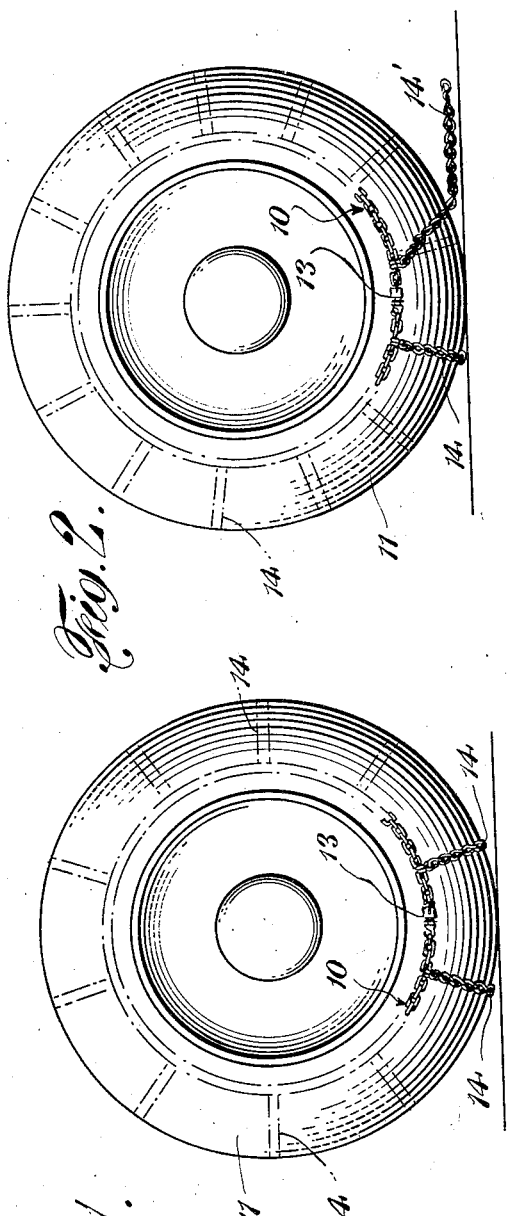
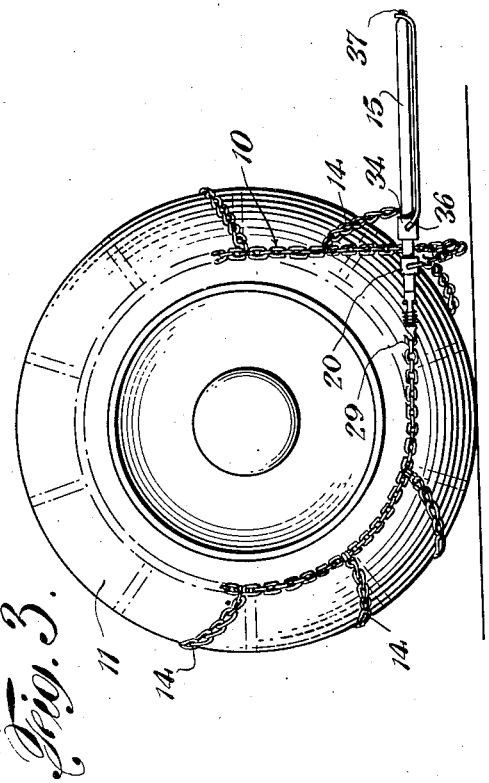
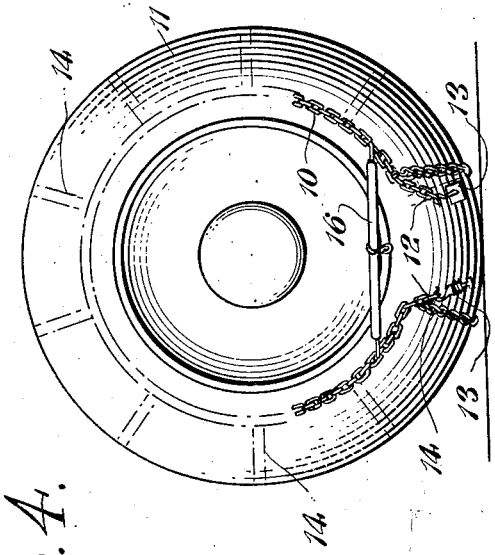
INVENTOR
William R. Royer
BY
Emery, Varney, Whittemore & Dix
ATTORNEYS Feb. 16, 1943. W. R. ROYER 2,311,621
TIRE CHAINS AND THEIR APPLICATION
Filed March 15, 1941 2 Sheets-Sheet 2
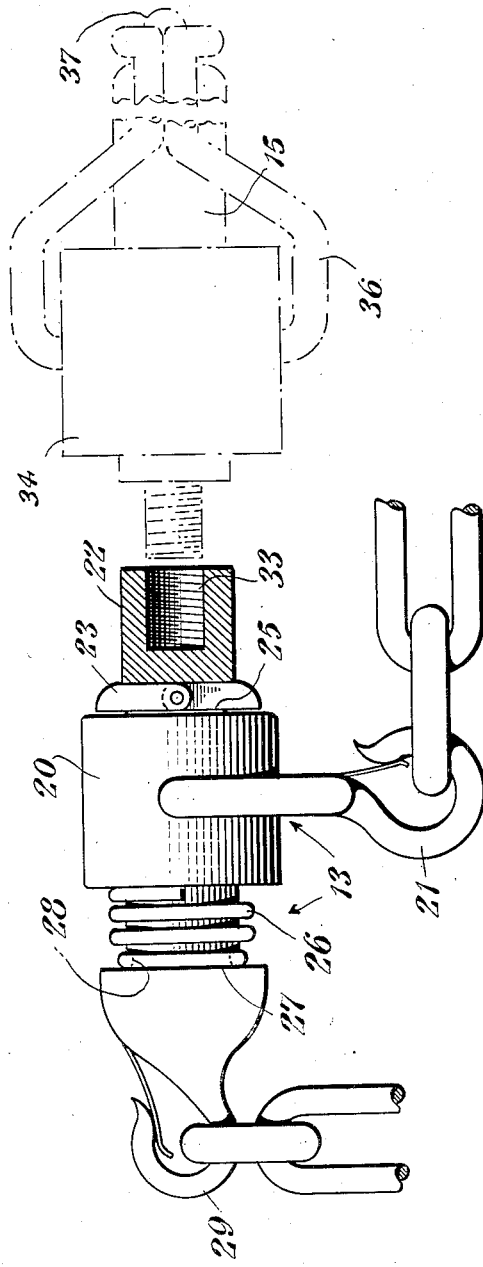
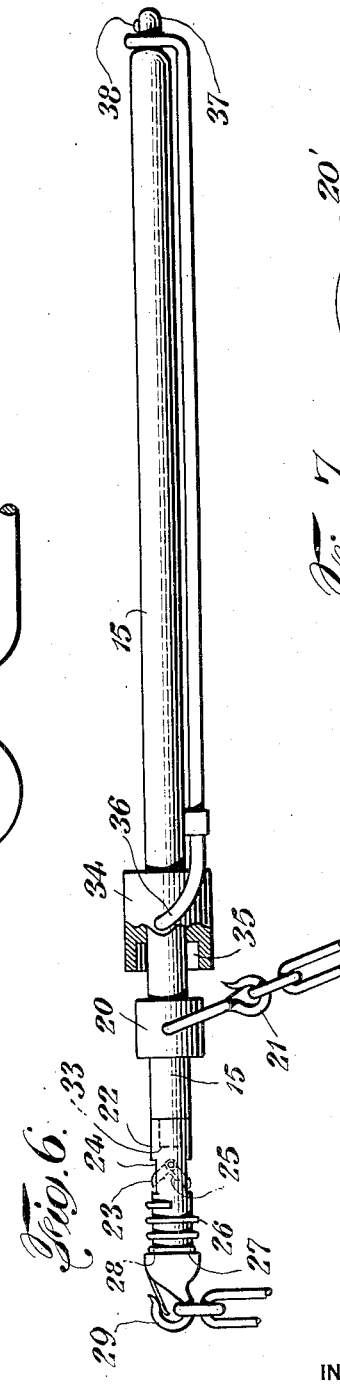
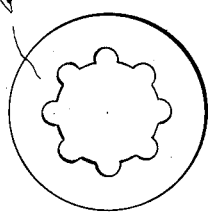
INVENTOR
William R. Royer
BY
Emery, Varney, Whittemore & Dix
ATTORNEYS Patented Feb. 16, 1943

2,311,621

UNITED STATES PATENT OFFICE 2,311,621

TIRE CHAIN AND ITS APPLICATION

William R. Royer, Wilkes-Barre, Pa.

Application March 15, 1941, Serial No. 383,471

17 Claims. (Cl. 152—213)

This invention relates to tire chains of the wrap-around type and to a method and facilities for applying the same, and has for an object the provision of improvements in this art.

The difficulties in applying wrap-around tire chains are mainly the inaccessibility of the rear side chain, the obstruction to the placement of the bottom cross chain, and the amount of pulling necessary to bring the ends of the side chains together.

According to the present invention the first difficulty is eliminated by the provision of an elongated device which can readily be passed around the back of the tire without the necessity of reaching the hand behind it.

The second difficulty is eliminated by providing a chain which is free from cross links at the connectible ends which are disposed between the bottom of the tire and the road surface when the chain is applied.

And the third difficulty is eliminated by providing a sliding or telescopic connection for the rear or both side chains which includes means for guiding the parts through the necessary distance to connect them. This telescopic connection may also provide the elongated parts which are useful in connection with the first problem.

While these problems have been enumerated separately they are not wholly unrelated to each other. Moreover, there are other problems which might be mentioned. All of these problems and their remedies may be related in different degrees. The invention therefore provides, in addition to useful equipment, a method of applying a tire chain which may utilize this equipment to the end that the chain may be more rapidly, easily and securely applied.

The invention may be explained in connection with one embodiment thereof which is shown in the accompanying drawings, wherein:

Fig. 1 is a rear view of a tire with one form of wrap-around chain and one form of connector in fully attached condition;

Fig. 2 is a rear view of a similar arrangement but with a connectible cross chain at the joint;

Fig. 3 is a rear view showing the chain being applied;

Fig. 4 is a front view as the chain is applied;

Fig. 5 is a side view, partly in section, of the connector alone;

Fig. 6 is a side view, partly in section, showing the connector and an accessory part for assisting in making the connection; and Fig. 7 is an end view of a modified form of sleeve.

My method of applying the chain unit is illustrated in Figs. 1, 3 and 4. Here it is seen that the wrap-around chain unit 10 is draped over the top of the tire 11 with the ends at the bottom near the point of engagement with the supporting surface. The ends of the side chains 12 are connected by devices 13 which in a preferred form will be later described herein.

Preferably the chain unit is provided with cross chains 14 which are so arranged as to furnish sufficient space at the joint to clear the supporting zone of the tire. One way to accomplish this, as shown in Fig. 1, is to space all of the cross chains sufficiently apart to clear the supporting zone. There are still as many cross chains as are needed for traction. Another method is to provide more space at the joint than elsewhere. And another method, as shown in Fig. 2, is to provide a detachable cross chain 14' at the joint. This may have snap hooks at the ends and, according to my method, one end of the cross chain 14' is connected to the rear side chain before it is placed on the tire, leaving the other end free to be connected to the front side chain when the car is moved. The last plan avoids jacking up the wheel, while the first two plans both avoid jacking up the wheel and turning it to install the chain unit.

Before the chain unit is placed on the tire the connector parts are attached (if not permanently attached) to the two ends of the two side chains, or at least the rear one. Also the auxiliary elongated member 15, which is used to aid in making the connection of the rear side chain, is attached to the appropriate connector part, as will later be described. When the chain unit is draped over the tire this elongated member is thrown around the back of the tire from front to back, or vice versa, so that it may be readily grasped without reaching behind the tire.

If desired, the connection of the side chains may be assisted by the use of a resilient connector 16 of the type described in my co-pending application, Serial No. 293,907, filed September 8, 1939. It is shown with snap hooks at its ends so as to be placed in the most convenient manner and later removed, if desired. This keeps the chain taut as the slack is worked out by advancement of the cross chains.

After the chain unit has been pulled up, the rear side chain is connected by the connector and its auxiliary elongated member. Then the front side chain is pulled together at the ends and connected, either by the present connector or by conventional connector devices.

The preferred form of connecting device 13 according to the present invention comprises a sleeve 20 attachable to one end of the side chain by a hook 21 pivoted to the sides of the sleeve. This may be a snap hook to provide for application and removal, if desired.

The mating part of the connecting device comprises a bar 22 adapted to slide in the opening of the sleeve 20 to permit a latch 23 carried thereby to engage the sleeve to hold the parts together. The latch, here made in two parts, may be hinged in a slot 24 in the bar and urged into latching position by a spring 25. To keep the sleeve tight against the latch after connection, the bar may be provided with a coil spring 26 which acts against the end of the sleeve in its final connecting movement. The outer end of the spring may be secured to the bar in any suitable manner, as by an end flange 27 and a groove 28 into which the end of the spring is set. A hook 29 secured to the end of the bar may be of the snap type for ready attachment and removal.

If the ends of the side chain are pulled sufficiently together the parts of the connecting device may be secured by telescoping them together by hand alone. For the front side chain this is often possible but for the rear side chain, and the front as well, if desired, it is easier to make the connection by providing the elongated auxiliary member 15 which here is formed as a bar extension which may be thrown around behind the tire and which increases the effective telescopic length of the connecting device. This auxiliary member is adapted to be secured to the bar member 22 as by a threaded plug and socket joint indicated at 33. The sleeve 20 may slide along the bar 22 and its extension 15 as a guide for a considerable distance in making the connection. The bar extension in effect constitutes a handle or tool.

The connector sleeve 20 may be pushed along the guide by hand directly or by an auxiliary hand sleeve member 34 slidably fitting on the elongted member 15. The front end of this tubular member engages the rear end of the sleeve 20 and pushes it along until it is caught by the latch 23. The end of the hand sleeve is cut away either interiorly or at a place on its circumference, as at 35, to stand free of the latch to avoid holding it down when the rear end of the sleeve 20 comes back to engage it. To disengage the latch the other end of the tubular member, which may be formed without a recess, can be used. Or, if desired, one end may have a a circumferentially extending cam surface between a recessed part and a full part to take care of either latching or unlaching by a turning movement.

The hand sleeve member 34 may be of considerable length or may be relatively short, as shown, and provided with a pivoted handle 36 to operate from various angles. The outer end of handle when not in use may be slipped and retained on an extension 37 of the bar 15, as by a spring ball catch 38 or by the resiliency of the parts and a cooperating groove, if desired. The angularly turned end of the handle assists in pushing.

After the parts of the connector have been secured together, the long auxiliary bar 15 and its pusher sleeve 34 are removed from the connector bar 22 and used to assist in making another connection, or replaced in the car.

If a detachable cross chain 14' is used, it is connected at its front end as soon as the wheel is moved up to the point it is to be passed across the tire. The rubber stretcher 16 is also removed from the front side chain unless it is desired to keep it on the chain in use.

All phases of the invention contribute to facilitating the application and removal of chains, and all or various ones of them together produce a very advantageous method of placing and removing chains to the end that it is unnecessary to jack up the wheel, and may even be unnecessary to move the wheel.

If desired, the bar or the sleeve 20' may be fluted, as shown in Fig. 7, to reduce the possibility of the parts freezing together.

A device of the kind described is very convenient and effective to use and maintains the skid chain securely coupled in service. To a large extent it avoids the necessity of unduly soiling the hands or clothes and avoids raising or moving the wheel so that the operation of applying and removing chains is a simple affair, capable of being performed by those who previously could not undertake the task. Using the improved method of application and the several instrumentalities suggested, the operation is made even easier.

While one principal embodiment of the invention has been described it is to be understood that the invention may have various embodiments within the limits of the prior art and the scope of the subjoined claims.

I claim:

1. A tire chain connector comprising in combination, two mating telescopic connectible members slidable longitudinally along each other, elements on said members connecting them to opposite ends of a side chain, and a detachable extension for one of said members which also slidably fits the other member whereby the members may be reached in making the connection without putting the arm around the tire.

2. A tire chain connector comprising in combination, two mating telescopic connectible members slidable longitudinally along each other, elements on said members for connecting them to opposite ends of a side chain, a latch mounted in one member permitting the other member to slide over it, and a rigid detachable extension for one of said members which also slidably fits the other member to form an elongated tool to assist in making the connection.

3. A tire chain connector, comprising in combination, bar and sleeve members attached to opposite ends of a side chain, latch means for holding the members together, an auxiliary bar member connectible to the bar connector member and forming an extension thereof upon which said sleeve member may slide, and an auxiliary sleeve member slidable on said bar member and its extension for pushing the connector sleeve member into locking position.

4. A tire chain connector as set forth in claim 3 which further includes an elongated handle secured to said auxiliary sleeve.

5. A tire chain connector as set forth in claim 3 which further includes an elongated handle hinged to said auxiliary sleeve, and cooperating elements for retaining said handle to said bar extension in non-used position.

6. A tire chain connector comprising in combination, a bar member, a sleeve member thereon, a latch on said bar, and a pusher also slidable on said bar, said pusher being recessed to span said latch while pushing the connector sleeve whereby to permit the latch to rise therebehind.

7. A connector as set forth in claim 6 wherein said pusher is also formed with means to engage the connector sleeve without providing rising space for the latch whereby to disconnect the members.

8. A tire chain connector, comprising in combination, a connector bar member provided with a snap hook at one end by which it is secured to the end of a side chain, a connector sleeve member slidable on the bar member and provided with a snap hook hinged to its sides by which it is secured to the end of a side chain, a two part latch hinged in a transverse slot in said bar member, a leaf spring secured to one of the latch parts for holding them in transversely aligned position, a spring surrounding said bar member for holding the sleeve member against the latch in locked position, one end of the spring being secured to the bar member at the hook end, a bar extension secured to the other end of said bar member, a pusher sleeve on the bar extension, an elongated split handle pivoted to the sides of said pusher sleeve, a bent loop on the end of said handle engaging a reduced part on said bar extension, and a spring ball for retaining said bent loop on said reduced bar end.

9. A tire chain connector comprising in combination, a male connector member attached for free movement to one end of a side chain, an extension on said male member of sufficient length beyond the end of a side chain at its coupling parts to pass from side to side behind the tire from one hand to the other when the forearms are placed across the tire at the ends of its supporting contact zone, a coupling element near the attached end of the male member, and a female member attached to the other end of the side chain for free movement, said female member receiving the male member entirely therethrough from the end back to the coupling element.

10. A tire chain connector comprising in combination, a male connector member attached for free movement to one end of a side chain, an extension on said male member of sufficient length beyond the end of a side chain at its coupling parts to pass from side to side behind the tire from one hand to the other when the forearms are placed across the tire at the ends of its supporting contact zone, a coupling element near the attached end of the male member, said extension being disconnectible from the attached part of the male member near its coupling element, and a female member attached to the other end of the side chain for free movement, said female member receiving the male member entirely therethrough from the end back to the coupling element.

11. A tire chain connector comprising in combination, a male connector member attached for free movement to one end of a side chain, an extension on said male member of sufficient length beyond the end of a side chain at its coupling parts to pass from side to side behind the tire from one hand to the other when the forearms are placed across the tire at the ends of its supporting contact zone, a coupling element near the attached end of the male member, a female member attached to the other end of the side chain for free movement, said female member receiving the male member entirely therethrough from the end back to the coupling element, and a connection-making member of sufficient length to pass from side to side behind the tire from one hand to the other when the forearms are placed across the tire at the ends of its supporting contact zone for moving said female member along the length of the male member up into latched position.

12. A tire chain connector comprising in combination, a male connector member attached for free movement to one end of a side chain, an extension on said male member of sufficient length beyond the end of a side chain at its coupling parts to pass from side to side behind the tire from one hand to the other when the forearms are placed across the tire at the ends of its supporting contact zone, a coupling element near the attached end of the male member, a female member attached to the other end of the side chain for free movement, said female member receiving the male member entirely therethrough from the end back to the coupling element, and a connection-making member of sufficient length to pass from side to side behind the tire from one hand to the other when the forearms are placed across the tire at the ends of its supporting contact zone for moving said female member along the length of the male member up into latched position, said connection-making member being relatively rigid to act in compression along its length in making the connection.

13. A tire chain connector comprising in combination, a male connector member attached for free movement to one end of a side chain, an extension on said male member of sufficient length beyond the end of a side chain and its coupling parts to pass from side to side behind the tire from one hand to the other when the forearms are placed across the tire at the ends of its supporting contact zone, a coupling element near the attached end of the male member, said extension being disconnectible from the attached end of the male member near its coupling element, a female member attached to the other end of the side chain for free movement, said female member receiving the male member entirely therethrough from the end back to the coupling element, and a connection-making member of sufficient length to pass from side to side behind the tire from one hand to the other when the forearms are placed across the tire at the ends of its supporting contact zone for moving said female member along the length of the male member up into latched position, said connection-making member including a relatively rigid handle and a laterally extending part adapted to embrace and slide along the length of the male member.

14. A tire chain connector comprising in combination, mating coupling members attached for free movement to the two ends of a side chain, said coupling members including coupling elements which engage and hold when the chain ends are brought together, and an extension on one of said coupling members of sufficient length beyond the end of the side chain at its coupling element to pass from side to side behind the tire from one hand to the other without reaching behind the tire, said extension passing completely through one of said coupling members and being disposed along the line of movement for guiding the members through a distance up to their coupling elements.

15. A tire chain assembly adapted to permit wrap-around chains to be applied without raising the wheel from the ground, comprising in combination, a wrap-around chain unit including side chains and cross chains, the connected terminal cross chains adjacent the ends of the side chains being spaced a sufficient distance from each other to insure that they do not come beneath the part of the tire resting on the ground when the chain unit is draped over the top of the tire with the connectible ends at the bottom, mating coupling members attached for free movement to the two ends of a side chain, said coupling members including coupling elements which engage and hold when the chain ends are brought together, and an extension on one of said coupling members which is of greater length than the circumferential length of contact of the tire with the ground so as to be of sufficient length beyond the end of the side chain at its coupling element to pass from side to side behind the tire from one hand to the other without reaching behind the tire, said extension passing completely through one of said coupling members and being disposed along the line of movement for guiding the members through a distance up to their coupling elements.

16. A tire chain assembly as set forth in claim 15 which further comprises in combination, a member for assisting in moving the ends of said chains and said coupling elements together along said extension.

17. A tire chain assembly as set forth in claim 15 which further comprises in combination, a rigid member having a guided sliding movement along said extension for assisting in moving the ends of said chains and said coupling elements together, said rigid member being of sufficient length to move the parts together without reaching the hand behind the tire.

WILLIAM R. ROYER.